Figure 2:
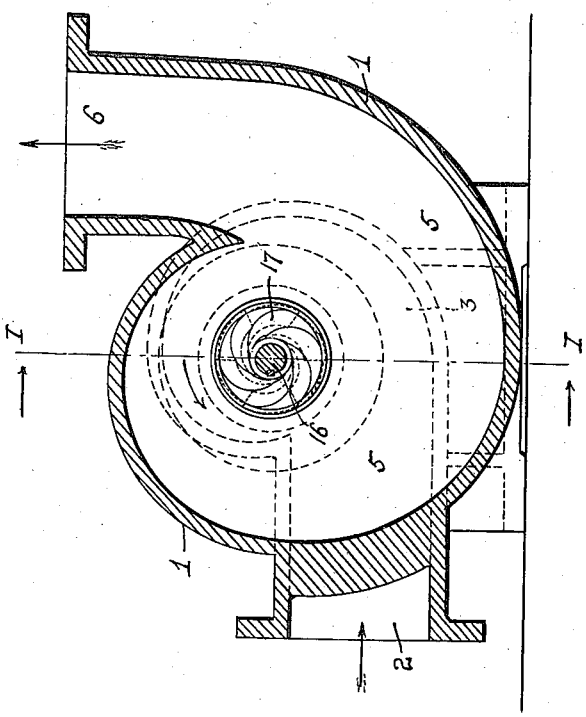

C. V. KERR.
CENTRIFUGAL PUMP.
APPLICATION FILED AUG. 27, 1913.

1,125,117.

Patented Jan. 19, 1915.
2 SHEETS—SHEET 1.

Witnesses
J. Milton Jester
H. P. Roberts

Inventor
Charles V. Kerr,
W. Schoenborn
Attorney

C. V. KERR.
CENTRIFUGAL PUMP.
APPLICATION FILED AUG. 27, 1913.

1,125,117.

Patented Jan. 19, 1915.
2 SHEETS—SHEET 2.

Witnesses
J. Milton Jester
H. P. Roberts

Inventor
Charles V. Kerr,
By W. Gelwenborn
Attorney

UNITED STATES PATENT OFFICE.

CHARLES VOLNEY KERR, OF WELLSVILLE, NEW YORK.

CENTRIFUGAL PUMP.

1,125,117.

Specification of Letters Patent.   Patented Jan. 19, 1915.

Application filed August 27, 1913. Serial No. 786,946.

*To all whom it may concern:*

Be it known that I, CHARLES V. KERR, a citizen of the United States, residing at Wellsville, in the county of Allegany and State of New York, have invented certain new and useful Improvements in Centrifugal Pumps, of which the following is a specification.

My invention relates to centrifugal pumps in general, and has for its salient objects to improve the construction of such pumps both as to mode of operation and also as to structural details for the accomplishment of the purposes hereinafter set forth.

My object in developing the present type of centrifugal pump is to secure such a form, that will have good efficiency when running at steam turbine speeds, and delivering a large volume of water at low heads, such as used for condensers in power plants, irrigation systems, and circulating water generally.

It has been found that a satisfactory and efficient high speed pump for large volumes and low heads and for purposes above mentioned has not been available.

The advantage in high speed for turbine driven pumps is clearly evident, when a certain steam turbine using steam at one hundred pounds gage pressure, with atmospheric exhaust, develops at twelve hundred revolutions per minute, seventeen brake horse power; at twenty-four hundred revolutions per minute, the same turbine develops thirty brake horse power; and at thirty-six hundred revolutions per minute, forty-one brake horse power. These different horse powers it has been found are developed by the turbine at the different speeds with precisely the same total amount of consumption of steam. As an increased efficiency is also developed in a pump of my construction at high speeds as compared with ordinary slow speed pumps, a plant comprising such a high speed turbine combined with my form of high speed pump further and greatly increases the economy or efficiency of the pumping unit.

A further object of my invention is to construct and arrange the blades on the impeller which lifts and propels the fluid, so that the same in view of its high velocity, will not act too abruptly in changing the direction of the movement of the fluid and cause a churning action and increase the friction, thereby reducing the efficiency, but allow a smooth action thereby enabling the full energy of the impeller to be expended in proper relation and action on the fluid. Said impeller is also so arranged and constructed with respect to the annular nozzle for the passage of the fluid to the outlet, that it will automatically act under all conditions of service to uniformly balance the pressures on both sides or fluid receiving faces of the impeller, and at the same time centralize said impeller with respect to the annular or nozzle outlet for the fluid to the discharge opening.

It is for the purpose of securing to the fullest extent possible, the accomplishment of the various objects and desiderata above set forth, that I have devised the present improvements, a preferred form of which is shown in the accompanying two sheets forming part of this specification, in which similar reference characters indicate the same parts throughout the several figures of drawing.

The invention consists of structural characteristics and relative arrangements of elements, which will be hereinafter more fully and clearly described, and particularly pointed out in the appended claims.

Figure 1:
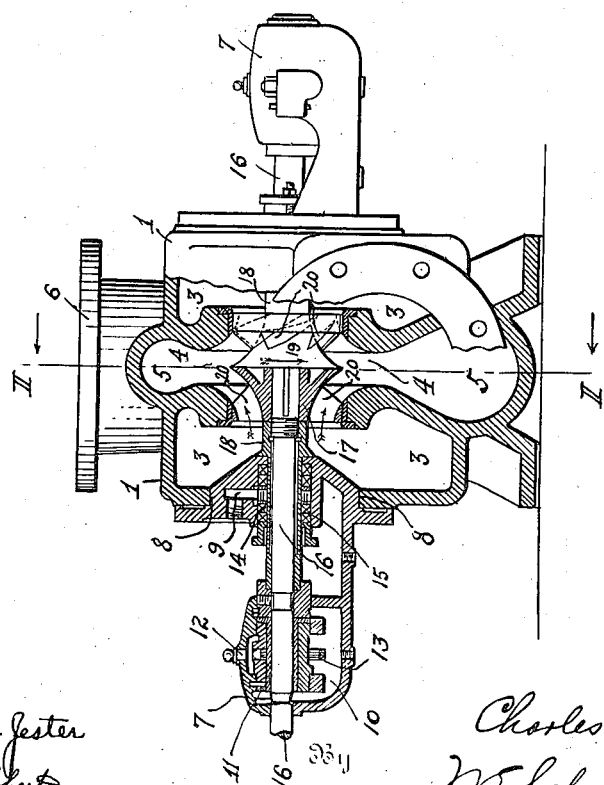
Figure 3:
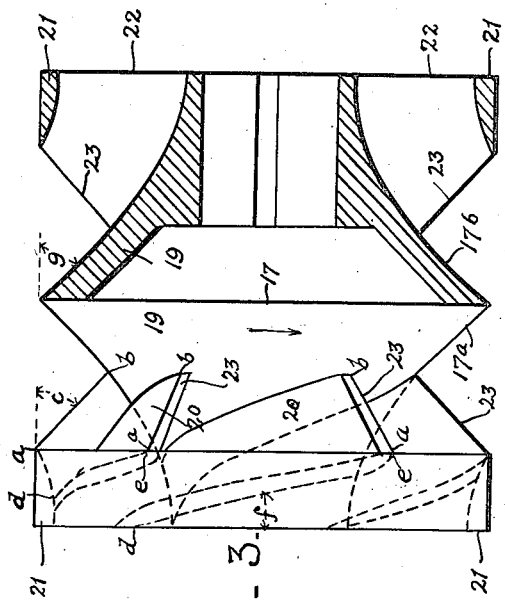
Figure 5:
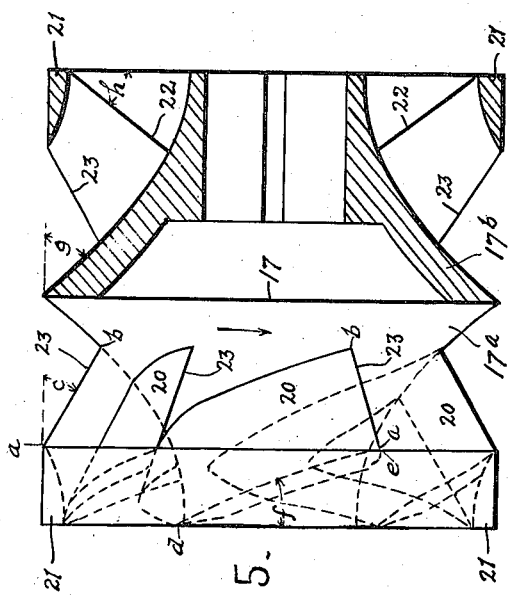
Figure 4:
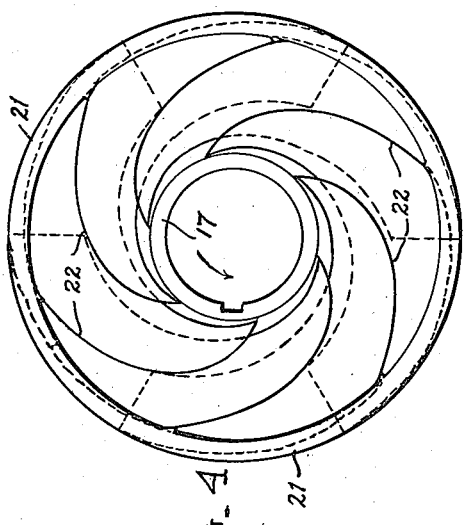
Figure 6:
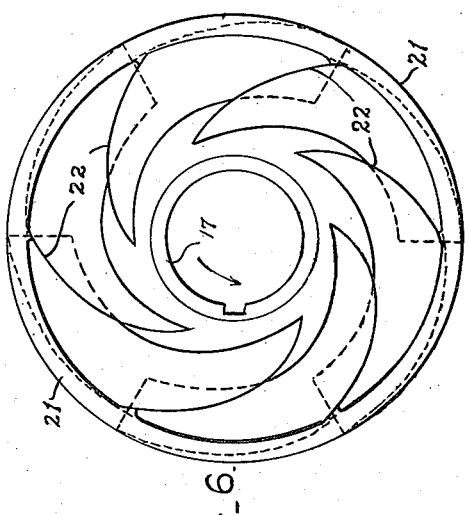

In the drawings:—Figure 1 is a transverse section of the pump on the line I—I of Fig. 2, showing one-half of the impeller and part of the casing and a bearing, in elevation; Fig. 2 is a section on line II—II of Fig. 1; Fig. 3 is a detail and enlarged peripheral view of the runner or impeller, one-half being in section and the other half in elevation; Fig. 4 is a side view of the runner or impeller, shown in Fig. 3; Fig. 5 is a similar view as Fig. 3 of a modified form of the runner or impeller; and Fig. 6 is a side view of the runner or impeller shown in Fig. 5.

Referring to the drawings 1 is a suitable casing provided with a water inlet 2, which is preferably branched or divided into two symmetrical volute suction chambers 3, 3, for reasons to be hereinafter explained. The interior or central section of the casing has formed therein the well rounded or annular nozzle 4 which leads into the passageway or discharge conduit 5, also preferably of volute shape, said conduit 5 communicating with the outlet opening 6, and being of gradually increasing cross sectional area, as shown in Figs. 1 and 2. 7, 7, are bearing heads suitably secured or bolted over the lateral openings 8, 8, of the casing 1, and each head 7 is cast in one piece and arranged as shown in Fig. 1 with two chambers 9 and 10. The outer chamber 10 contains a dust proof bearing 11 provided with the usual opening 12 and lubricating ring 13, while the inner chamber 9 projects into the suction chamber 3 of the casing 1, and is provided with a stuffing box 14 having any suitable form of packing 15, the specific form of said bearings 11, and packing 15, forming no essential features of the present invention, as any other forms may be readily substituted without departing from the spirit of my invention.

An impeller shaft 16 passes through the casing 1 and chambers 9 and 10 in the heads 7, and is rotatably supported in the bearings 11, as shown. Said shaft may be connected to any form of high speed steam turbine, or electric motor by means of a flexible coupling, as shown, for example, in my copending application Serial No. 586,629. Attached by a suitable key or other means, well known in this class of inventions, to said shaft 16, is a spiroidal runner or impeller 17 preferably made in two sections $17^a$ and $17^b$, as shown in Figs. 3 and 5, and while I have shown the same as cored, the same may be solid or in one piece, if so desired. Said sections $17^a$ and $17^b$ are secured in place by means of sleeves 18 firmly secured to the shaft 16, on each side of the impeller or runner 17, and are so arranged that they rigidly hold the two sections of the impeller or runner 17 together in a fixed relation and keep them from slipping longitudinally on the shaft 16. Said spiroidal impeller or runner 17 is of the semi-open type and may be made of semi-steel, crucible steel, or non-corroding alloy or bronze, and when the two sections $17^a$ and $17^b$ are properly placed together or assembled, a periphery of V-shape or conoidal section 19 is formed, as shown in Figs. 3 and 5, having an angle $g$ with the axis of the impeller. The vanes or blades 20, 20 on the conoidal periphery 19 of the impeller 17 are so formed and arranged as to form spiroidal working surfaces as shown, said surfaces being generated (see Figs. 3 and 5) by moving a line represented by $a$—$b$ making an acute angle $c$ with the axis of the impeller, while moving along a helical directrix represented by the line $d$—$e$, which directrix is inclined at an angle $f$ to a plane normal to the axis of the impeller. The outer edges of the blades or vanes 20, 20 are supported and held together by a shroud ring 21 which is preferably cast, as shown, integral with the impeller.

22, 22, are the inlet edges of the blades or vanes 20, 20, which are spiral instead of radial, and 23, 23, indicate the discharge edges.

In Figs. 5 and 6 is shown an impeller or runner in which the angle $c$ between the generating line $a$—$b$ and the axis of the impeller is smaller than the angle in generating the impeller, shown in Figs. 3 and 4, which is the form I use when it is desired to avoid too long an inlet edge 22, and is formed by undercutting the usual normal entering face 22 of the blade 20, and instead of the entering face of the blade being normal to the axis of the impeller as shown in Figs. 3 and 4, said entering face forms an angle $h$ with the normal outside face or plane of the impeller.

In the forms of impeller 17 illustrated for example in Figs. 3 and 5, six blades or vanes 20 are used on each side, which number may be varied to suit conditions and capacity, if so desired, and will be fully within the scope of my invention. I have found that this form of impeller or runner is not only theoretically correct, but it also permits the vanes and spiroidal working faces to be readily machined or smoothed for action, thereby reducing the frictional resistances. Furthermore, by making the impeller 17 in two sections, $17^a$ and $17^b$, the same can be cheaply manufactured, easily handled and adjusted, and made perfectly rigid and balanced, so that it retains its form under the unusual high speeds.

While my preferred form of impeller is shown in Figs. 3 and 5, in which the blades or vanes 20 on each side of the impeller are directly opposite each other, I have found that this particular arrangement is not necessary for the successful operation of the pump, and said blades may be staggered by simply partly turning on the shaft 16, one of the sections $17^a$ or $17^b$ of the impeller, through any angle, but preferably one corresponding to one-half the peripheral distance between the apexes of the blades 20. During the operation of the impeller 17, rotating rapidly in the direction of the arrow shown in Figs. 1 and 2, the water flows through the intake or inlet 2 and is divided and carried into the two volute suction chambers 3, 3, and is there properly taken up by the spiral shaped inlet edges 22, 22, on opposite sides of the impeller which enter into the streams of water like a wedge splitting wood, and the spiroidal shaped working faces of the impeller then act flatwise upon the water, instead of edgewise as in the usual form of helical pumps, and the water is discharged from the impeller through a well rounded orifice or annular nozzle 4 and enters the volute discharge conduit 5 and is forced through the outlet 6.

While I have shown a double suction pump, it will be readily seen that any form of impeller and casing having suction and discharge chambers, could be adopted for single suction pumps. The double suction has not only the advantage of double capacity at the same speed, but is also self balancing for the reason that if the impeller 17 moves to the right of its position shown in Fig. 1, the area of the discharge from the impeller 17 into the annular nozzle 4 at the right will be made smaller or narrower, while that on the left will be larger or wider, the result being to increase the discharge head or pressure on the right and increase the suction on the left, the combined effect of which is to promptly adjust the impeller 17 back to its proper and central position where the balancing forces are equalized, said balancing force being greatest at maximum discharge and becoming zero at no discharge, or shut-off.

The lateral openings 8 receiving the bearing heads 7 are slightly larger in diameter than the impeller 17, and by removing one of said bearing heads, the impeller with its shaft 16 can be easily withdrawn from the casing 1, which construction and arrangement enables the use of a solid casing, thereby avoiding the use of packed joints required by the usual split case construction.

It will be readily seen that owing to the volute shape of the suction chamber or chambers 3, the relation of the annular nozzle 4, volute discharge passage-way 5, and the spiroidal impeller 17, with respect to said suction chambers 3, the fluid is directed into and moves with the impeller in a perfect spiral path, thereby taking up the rapid movement of the impeller without any churning action and producing a smooth and efficient operation of the pump.

From the foregoing disclosure it will be readily seen that the casing, bearings, shaft and impeller and its parts, are easily accessible, and the construction of the pump is such that all the parts of the same may be cheaply and accurately manufactured and quickly installed and adjusted, or repaired, so as to insure steady and continuous running under highest of speeds and with excellent efficiency.

What I claim is:—

1. A rotary impeller for centrifugal pumps comprising a shaft, a conoidal surface surrounding and symmetrically arranged with respect to the axis of said shaft, and having a base which forms a comb or ridge near the periphery of said impeller, a series of vanes or blades arranged as right or left hand spiroidal surfaces on said conoidal surface, said spiroidal surfaces being generated by a line which moves at an acute angle with respect to the axis of the shaft or impeller while moving along a helical directrix, and said conoidal surface being generated by revolving a line about the axis of the shaft.

2. A rotary impeller for centrifugal pumps comprising a shaft, conoidal surfaces surrounding and symmetrically arranged with respect to the axis of said shaft and having adjoining bases which form a comb or ridge near the middle of said impeller, a series of vanes or blades arranged as right and left hand spiroidal surfaces on said conoidal surfaces, said spiroidal surfaces being generated by a line which moves at an acute angle with respect to the axis of the shaft or impeller while moving along a helical directrix, and said conoidal surfaces being generated by revolving a line about the axis of the shaft.

3. In a centrifugal pump the combination of a volute casing having inlet and outlet openings with an annular nozzle the interior surfaces of which join smoothly to each other, said annular nozzle being generated by revolving about the axis of said casing the longitudinal mid-section of a diverging nozzle having a rounded entrance, said mid-section lying in a plane passing through said axis, and a double suction spiroidal impeller rotatably supported centrally with respect to said annular nozzle, having axial movement for the purpose of centering said impeller in proper relation to the nozzle by the action of the fluid discharged.

4. In a centrifugal pump the combination of a casing having volute suction and volute discharge conduits, an annular nozzle merging in the discharge conduit, a double suction spiroidal impeller having a central comb or ridge rotatably supported centrally with respect to said annular nozzle and having axial movement with respect to said annular nozzle, said parts so constructed and assembled as to produce a self-centering action of the impeller during discharge of fluid.

5. In a centrifugal pump the combination of a casing having volute suction and volute discharge conduits, an annular nozzle merging in the discharge conduit, and a double suction spiroidal impeller having a central comb or ridge and spiral entering edges rotatably supported centrally with respect to said annular nozzle.

In testimony whereof I affix my signature in presence of two witnesses.

CHARLES VOLNEY KERR.

Witnesses:
 VOLNEY A. KERR,
 KENYON APPLEBEE.